United States Patent
Fei et al.

(10) Patent No.: US 10,736,426 B2
(45) Date of Patent: Aug. 11, 2020

(54) HEADREST DEVICE, SOFA ACCESSORY HAVING THE HEADREST DEVICE

(71) Applicant: HAINING MY HOME MECHANISM CO., LTD., Haining (CN)

(72) Inventors: Zhongqiang Fei, Haining (CN); Xiqi Sun, Haining (CN); Shaoqiang Fei, Haining (CN)

(73) Assignee: HAINING MY HOME MECHANISM CO., LTD., Haining (CN)

( * ) Notice: Subject to any disclaimer, the term of this patent is extended or adjusted under 35 U.S.C. 154(b) by 0 days.

(21) Appl. No.: 16/396,771

(22) Filed: Apr. 29, 2019

(65) Prior Publication Data

US 2020/0054140 A1    Feb. 20, 2020

(30) Foreign Application Priority Data

Aug. 16, 2018  (CN) ..................... 2018 2 1325623 U

(51) Int. Cl.
| A47C 7/38 | (2006.01) |
| A47C 17/04 | (2006.01) |
| B60N 2/838 | (2018.01) |
| A47C 7/46 | (2006.01) |

(52) U.S. Cl.
CPC ................. *A47C 7/38* (2013.01); *A47C 17/04* (2013.01); *A47C 7/46* (2013.01); *A47C 7/462* (2013.01); *B60N 2/838* (2018.02)

(58) Field of Classification Search
CPC .. A47C 7/38; A47C 7/46; A47C 7/462; B60N 2/838
See application file for complete search history.

(56) References Cited

U.S. PATENT DOCUMENTS

| 2,869,622 | A | * | 1/1959 | Petersen | ................... A47C 7/38 |
| | | | | | 297/396 |
| 5,011,225 | A | * | 4/1991 | Nemoto | ................. B60N 2/856 |
| | | | | | 297/408 |
| 8,702,173 | B2 | * | 4/2014 | Adams | .................... A47C 1/036 |
| | | | | | 297/408 |
| 9,675,178 | B2 | * | 6/2017 | Lu | ............................ A47C 7/38 |
| 9,681,751 | B2 | * | 6/2017 | Lu | ............................ A47C 7/38 |
| 9,730,522 | B2 | * | 8/2017 | Donovan | ................. A47C 1/02 |
| 9,826,841 | B2 | * | 11/2017 | Donovan | ................. B60N 2/66 |
| 9,861,204 | B2 | * | 1/2018 | Lu | ............................ A47C 7/38 |

(Continued)

*Primary Examiner* — Syed A Islam

(57) ABSTRACT

A headrest device includes a support frame, a pillow plate, a first driving member and a first transmission member. The first transmission member includes a first transmission rod, two first connecting plates, and two elastic members. Each end of the first transmission rod is respectively provided with a first extending plate pivotally connected to the support frame with a first pivot. Each of the two first connecting plates is pivotally connected to the first extending plate with a second pivot. The headrest device has a first rotating process when there is no obstruction in its path, in which the first transmission member rotates about the first pivot relative to the support frame to tilt the pillow plate, and a second rotating process when there is an obstruction, in which the pillow plate and the two first connecting plate rotate about a second pivot relative to the first extending plate.

10 Claims, 13 Drawing Sheets

(56) References Cited

U.S. PATENT DOCUMENTS

| | | | | |
|---|---|---|---|---|
| 9,867,467 | B2* | 1/2018 | Thorwesten | A47C 7/00 |
| 9,949,567 | B2* | 4/2018 | Sigmon | A47C 1/02 |
| 10,098,471 | B2* | 10/2018 | Li | A47C 7/38 |
| 10,104,977 | B2* | 10/2018 | Li | A47C 1/0242 |
| 10,376,063 | B2* | 8/2019 | Donovan | A47C 7/38 |
| 10,653,245 | B2* | 5/2020 | Zhang | A47C 7/38 |
| 2017/0360201 | A1* | 12/2017 | Brown | A47C 7/462 |
| 2018/0027979 | A1* | 2/2018 | Zhao | A47C 20/041 |
| 2019/0021503 | A1* | 1/2019 | Lu | F16H 21/54 |
| 2020/0015594 | A1* | 1/2020 | Carrera | B60N 2/838 |

* cited by examiner

HEADREST DEVICE, SOFA ACCESSORY HAVING THE HEADREST DEVICE

CROSS REFERENCE TO RELATED APPLICATIONS

The present application is based on, and claims priority from, Chinese patent application number CN201821325623.6, filed on Aug. 16, 2018, the disclosure of which is hereby incorporated by reference herein in its entirety.

TECHNICAL FIELD

The present disclosure relates to smart furniture and in particular to a headrest device and a sofa accessory having the headrest device.

BACKGROUND

A headrest device can be configured for supporting a head of a human body to improve comfort while sitting down and is widely used in furniture such as sofas and chairs. The headrest device generally can have a head plate, which can be rotated and tilted manually or by a power source to provide multi-angle support for the head. However, if a person's arm and fingers reach the back of the head plate, when the head plate returns back, the arm and fingers may be pinched or crushed. Therefore, the headrest device is not completely safe, limiting its development.

SUMMARY

The present disclosure provides a headrest device including a support frame, a pillow plate, a first driving member and a first transmission member, wherein the first driving member is disposed on the support frame. The first transmission member includes a first transmission rod, two first connecting plates and two elastic members, wherein each end of the first transmission rod is respectively provided with a first extending plate. The first extending plate is pivotally connected to the support frame with a first pivot. Each of the two first connecting plates is pivotally connected to the first extending plate with a second pivot. The pillow plate is connected to the two first connecting plates. One end of each of the two elastic members is connected with the first extending plate, and the other end of each of the two elastic members is connected with each of the two first connecting plates. The first driving member is connected with a middle part of the first transmission rod and configured for driving the first transmission rod and the first extending plate to rotate about the first pivot. The headrest device has a first rotating process without an obstruction, in which the first transmission member and the pillow plate rotate about the first pivot relative to the support frame to tilt the pillow plate, and a second rotating process with the obstruction, in which the pillow plate and the two first connecting plate rotate about the second pivot relative to the first extending plate.

The first extending plate is provided with a first hole. Each of the two first connecting plates is provided with a third hole. A first limiting element penetrates through the first hole and the third hole and is defined as the second pivot.

The first extending plate is further provided with a first sliding slot, and the first sliding slot is configured to limit the second angle in the second rotating process.

Each of the two first connecting plates is further provided with a second hole. A second limiting element penetrates through the second hole and the first sliding slot and is capable of sliding along the first sliding slot.

The first extending plate is provided with a first protrusion configured for connecting with the one end of each of the two elastic members. Each of the two first connecting plates is provided with a second protrusion configured for connecting the other end of each of the two elastic members.

The first extending plate is disposed on ends of the first transmission rod and configured for supporting the first transmission rod.

The headrest device further includes a cushion configured for covering the support frame.

The first drive member includes a linear motor.

The present disclosure further provides a sofa accessory including the headrest device.

The sofa accessory further includes a lumbar support assembly disposed on the support frame. The lumbar support assembly includes a second driving member and a waist plate. The second driving member is disposed on the support frame and configured for driving the waist plate to rotate, resulting in making the waist plate tilt. The waist plate is configured for supporting a waist of a human body.

The headrest device and the sofa accessory including the headrest device have many advantages. For one, because each of the two first connecting plates is pivotally connected to the first extending plate with the second pivot, the two first connecting plates are configured for rotating about the second pivot relative to the first extending plate. If the arm and figures of human body stretch to back of the tilted pillow plate and are regarded as the obstruction, in a returning back process of the pillow plate, the two first connecting plates can rotate about the second pivot, in order to prevent the arm and figures from injury.

DETAILED DESCRIPTION

Embodiments of the present disclosure will be described in detail below, and examples of the embodiments will be illustrated in the accompanying drawings. The embodiments described below with reference to the drawings are illustrative and are intended to explain the present disclosure, and not to be construed as a limitation to the present disclosure.

It should be noted that when an element is referred to as being "assembled on" another element, it may be directly or indirectly disposed on another element. When an element is considered to be "fixed" to another element, it may be directly or indirectly attached to another element.

All technical and scientific terms used herein have the same meaning as commonly understood by one of ordinary skill in the art to which this disclosure is claimed. The terminology used in the description herein is for the purpose of describing particular embodiments, and is not intended to limit the disclosure. The term "or/and" as used herein includes any and all combinations of one or more of the associated listed items.

Figure 1:
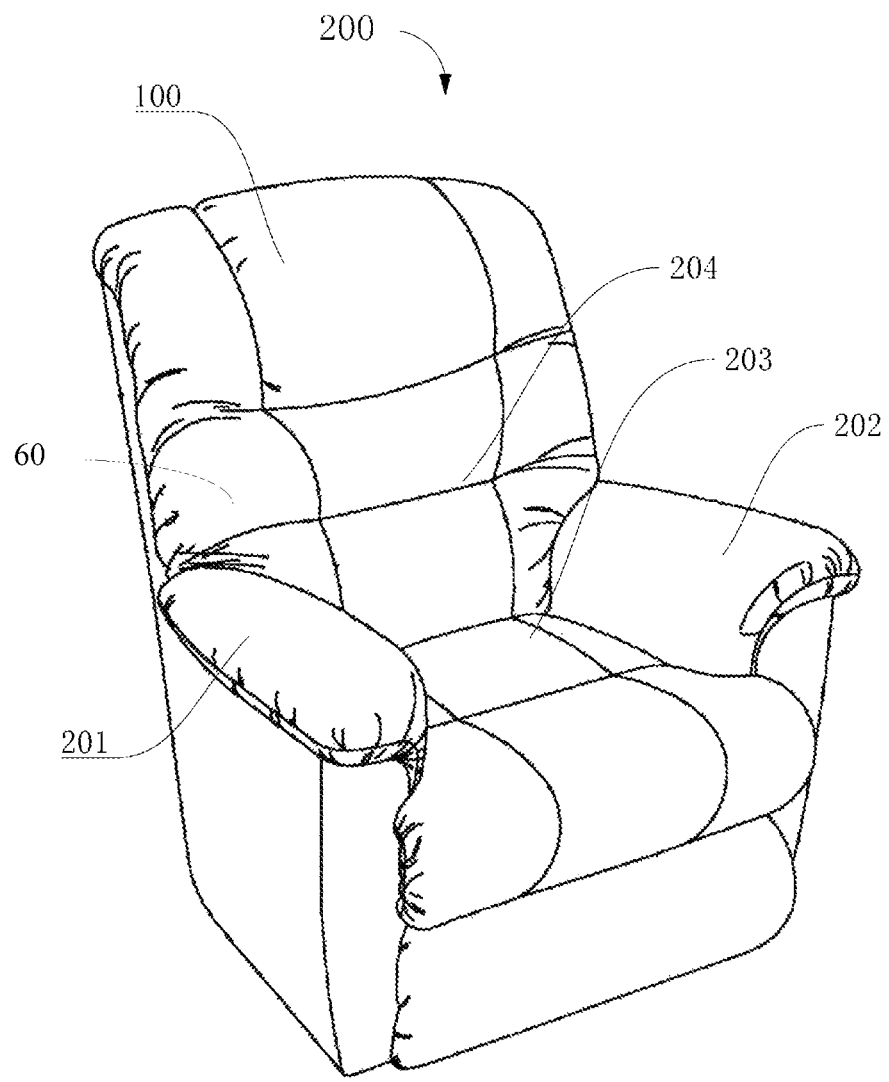
FIG. 1 is a perspective view of an embodiment of a sofa accessory having a headrest device.
Figure 2:
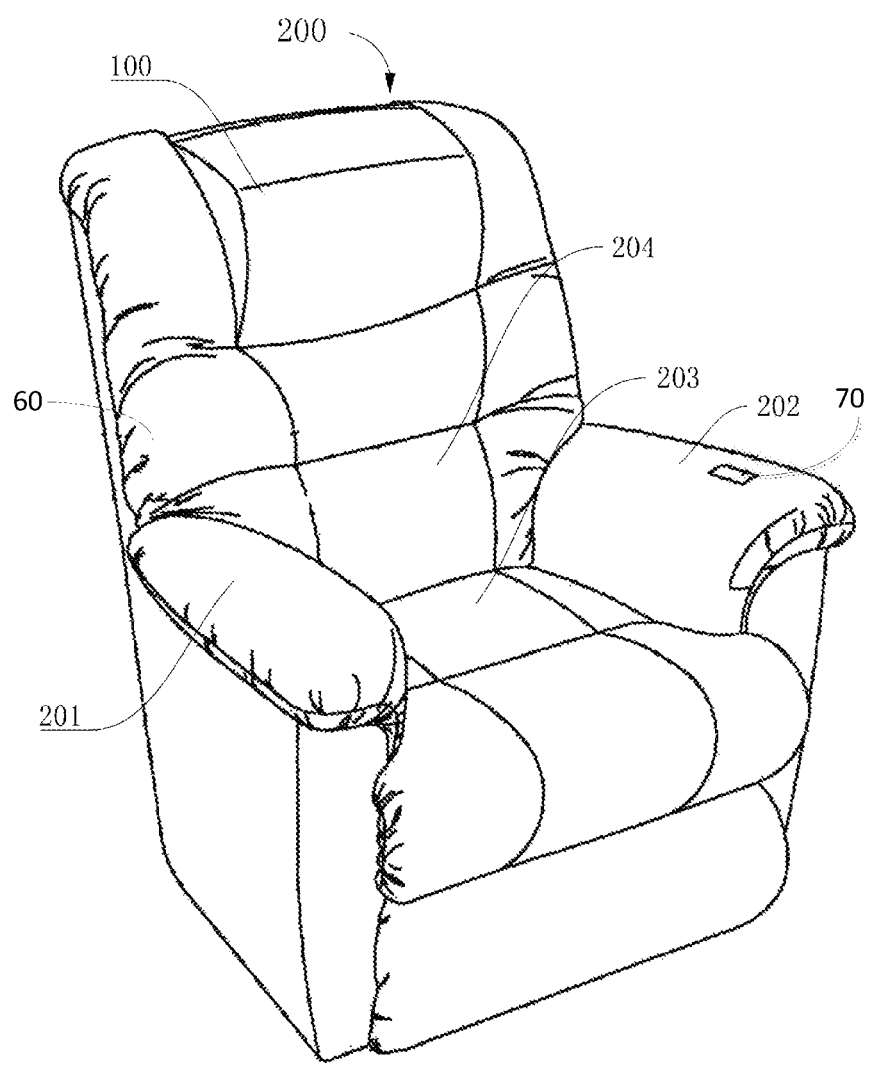
FIG. 2 is a perspective view of the sofa accessory of FIG. 1 with a tilted pillow plate.

Referring to FIG. 3 to FIG. 11, an embodiment of a headrest device 100 in is provided. Referring to FIG. 1 and FIG. 2, a sofa accessory 200 having the headrest device in another embodiment is further provided. The headrest device 100 can be used for supporting a head of human body to improve comfort when sitting down or sleeping.

The headrest device 100 can be applied in household like the sofa accessory 200. Furthermore, the headrest device 100 is not limited to only be applied in the single-person style sofa, but can also be applied in other double-person or multi-person style sofas. The headrest device 100 can also be applied to a seat of the automobile, the reclining chair of the furniture, the bed, and the like having the head supporting member.

The sofa accessory 200 includes a first arm support portion 201, a second arm support portion 202, a hip support portion 203, a back support portion 204 and a headrest device 100. The first arm support portion 201 and the second arm support portion 202 can be configured for supporting a human body arm. The hip support portion 203 can be configured for supporting the major weight of the human body. The back support portion 204 can be configured for supporting the back of the human body. The headrest device 100 can be configured for supporting a human head.

The headrest device 100 is located above the back support portion 204. The headrest device 100 can be wrapped with a cushion 60 made of sponge, leather or the like to improve flexibility, so that the human head has a relatively good contact.

When the headrest device 100 is not in a tilted state, its surface is flush with a surface of the back support portion 204. When the headrest device 100 is in a tilted state, a pillow plate 20 of the headrest device 100 will tilt with a tilt angle and extend outward, thereby realizing an adjustment of the pitch angle of the human head and improving user's comfort feeling.

The headrest device 100 includes a control assembly 70 which can be located on the second arm support portion 202 and configured for controlling the tilt angle of the pillow plate 20. In other embodiments, the control component of the headrest device 100 can also be located on other parts of the sofa accessory 200.

Figure 3:
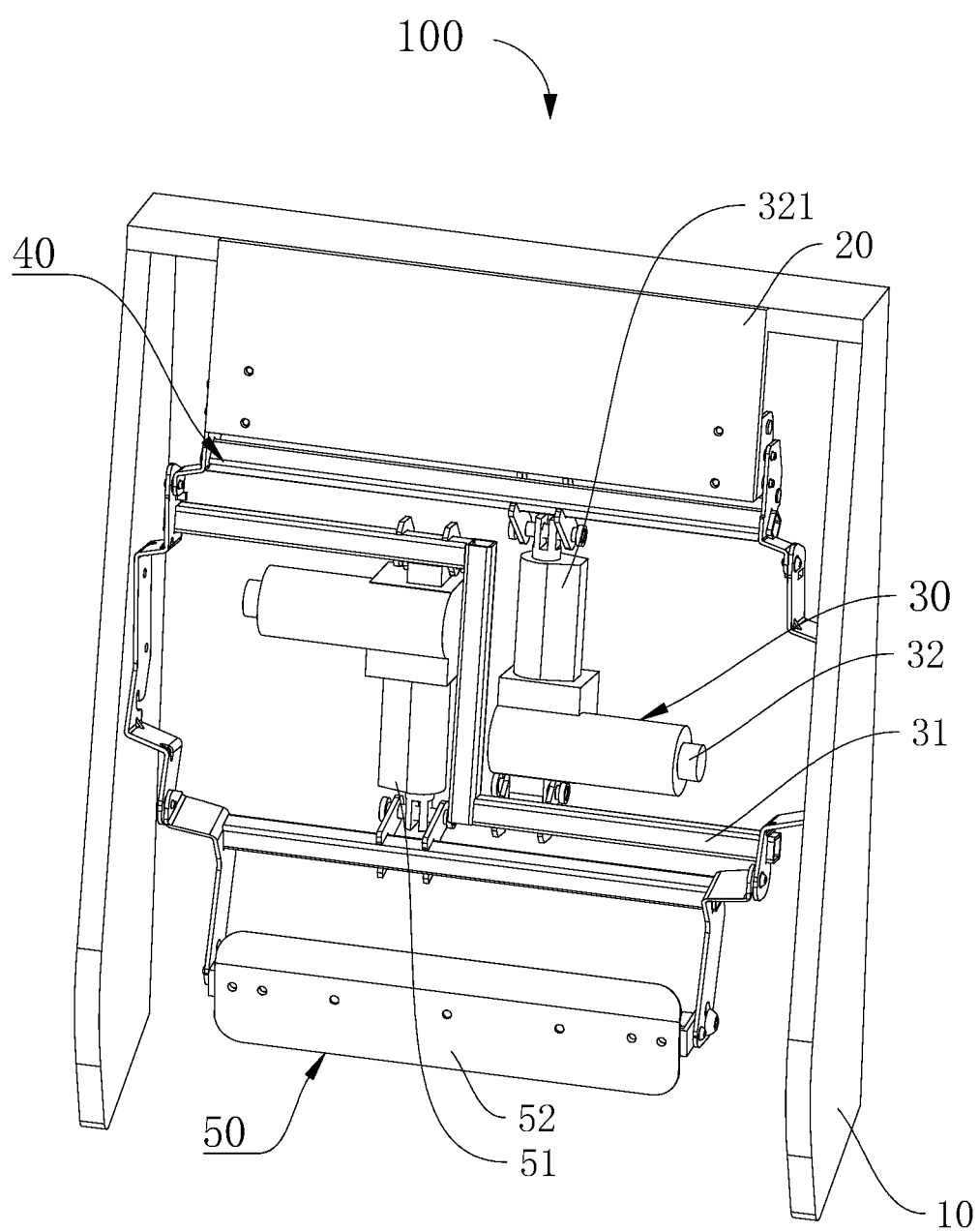
FIG. 3 is a perspective view of another embodiment of a headrest device.
Figure 4:
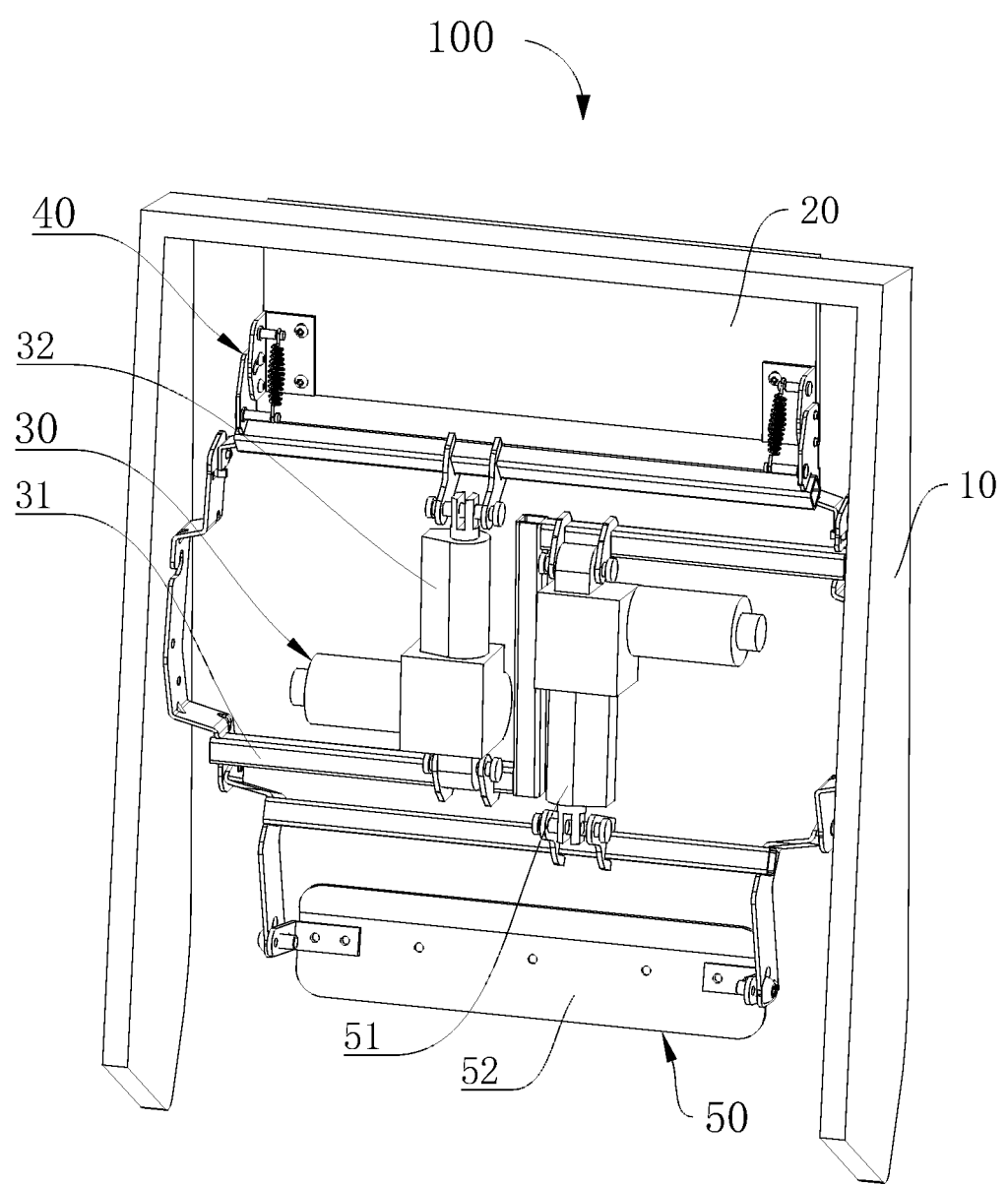
FIG. 4 is another perspective view of the headrest device of FIG. 3.

Referring to FIG. 3 and FIG. 4, the headrest device 100 includes a support frame 10, a pillow plate 20, a first driving member 30 and a first transmission member 40. The support frame 10 can be configured for supporting the first driving member 30 and located in the sofa accessory 200. The pillow plate 20 can be connected to the first transmission member 40 and rotate together with the first transmission member 40. The first driving member 30 is fixed to the support frame 10. The first transmission member 40 can be connected to the first driving member 30 and be driven to rotate by the first driving member 30.

The support frame 10 can be configured for fixing the pillow plate 20, the first transmission member 40 relatively and supporting the first driving member 30. The pillow plate 20 can be configured for supporting a head of user's body. The first driving member 30 can be used for driving the first transmission member 40 to rotate, resulting in the pillow plate 20 rotating at the same time. That is, the first transmission member 40 can be regarded as transmitting the force of the first driving member 30. The pillow plate 20 can rotate and tilt within an adjustable angle while the first driving member 30 has a telescopic actuation, thereby achieving multi-angle support for the head.

The support frame 10 can include a plurality of support plates. The support frame 10 can be made of wood or other materials like plastic, metal and so on.

Figure 5:
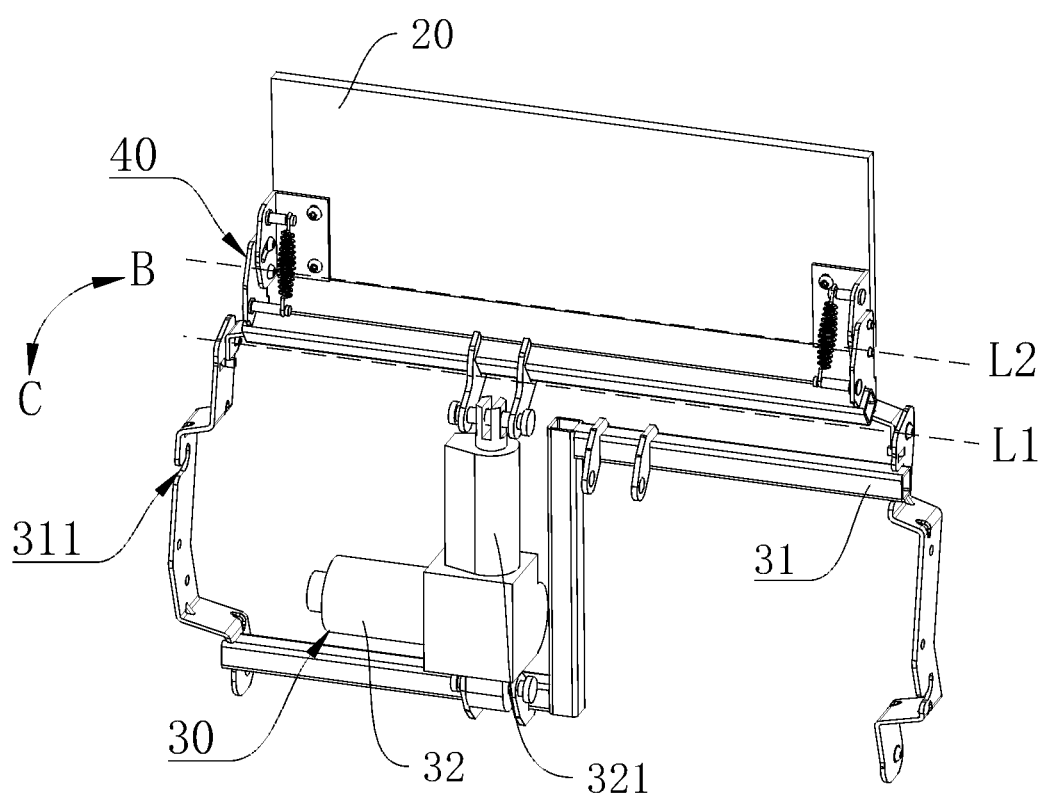
FIG. 5 is a perspective view of the headrest device of FIG. 3 without a support frame.
Figure 6:
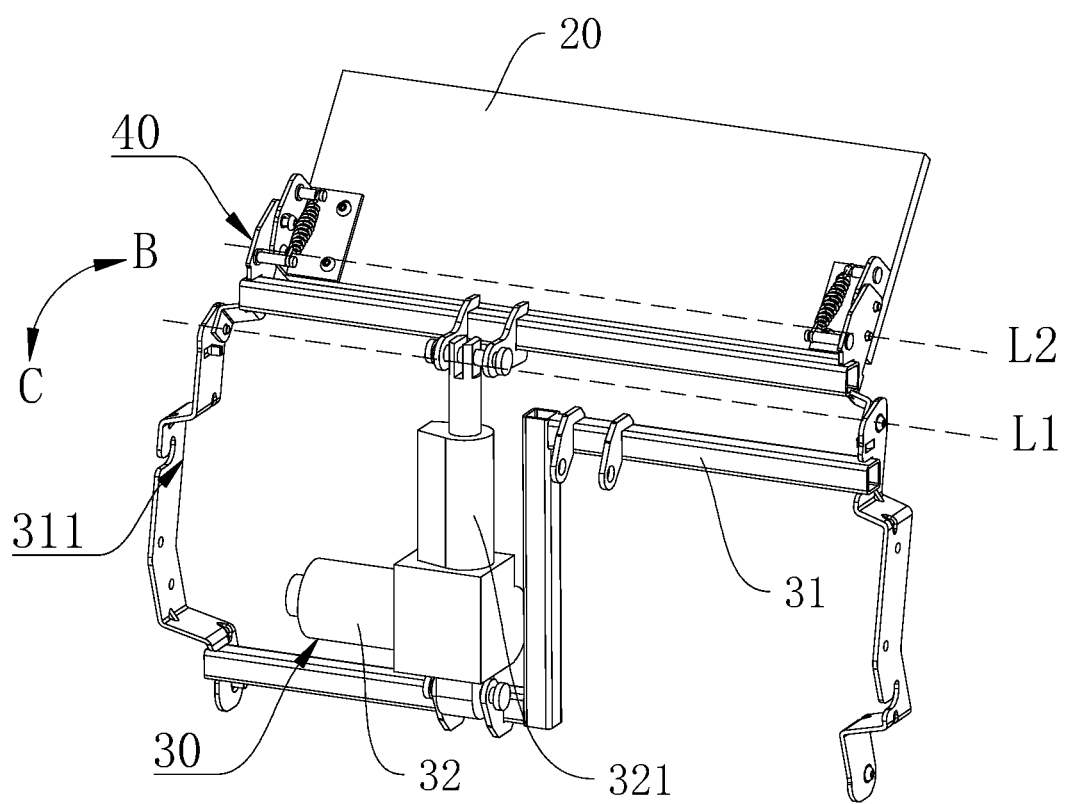
FIG. 6 is another perspective view of the headrest device of FIG. 5.

Referring to FIG. 5, and FIG. 6, the pillow plate 20 can be connected and fixed to the first transmission member 40, in order to rotate together with the first transmission member 40. The pillow plate 20 can be any shape, such as square.

The first driving member 30 can include a fixing element 31 and a power source 32. The fixing element 31 is fixed to the support frame 10 and configured for supporting the power source 32. The power source 32 is configured for driving the first transmission member 40.

In this embodiment, the fixing element 31 is formed by splicing a plurality of metal plates and is screwed to the support frame 10. In another embodiment, the fixing element 31 can be integrally formed by a molding method such as casting or three-dimensional printing, and the fixing element 31 can also be formed by splicing a plurality of plates made of other materials. The fixing element 31 can also be fixed the support frame 10 by means of riveting, welding or the like.

The fixing element 31 can be provided with an arcuate opening 311. By providing the arcuate opening 311, the fixing element 31 can be connected with various sofas, and the headrest device 100 can be applied.

One end of the power source 32 can be fixedly disposed on the fixing element 31, and the other end of the power source 32 can be connected to the first transmission member 40. The power source 32 is configured for outputting power to drive the first transmission member 40 to rotate.

In the present embodiment, the power source 32 can be a linear motor capable of outputting a reciprocating linear motion. The power source 321 includes an output shaft 321 configured for outputting the reciprocating telescopic motion. The output shaft 321 is coupled to the first transmission member 40. The output shaft 321 can drive the first transmission member 40 to reciprocate, resulting in moving the pillow plate 20 together.

It can be understood that in other embodiments, the power source 32 can also be a motor that provides a rotary motion. At this time, a cam link mechanism or other mechanism can be disposed between the power source 32 and the first transmission member 40 to convert the reciprocating of the power source 32 to the first transmission member 40 and then to the pillow plate 20. In other embodiments, the power source 32 may also be other types of power output devices such as a hydraulic motor.

Referring to FIG. 7, FIG. 8, FIG. 9 and FIG. 10, the first transmission member 40 can include a first transmission rod 41, two first connecting plates 42 and two elastic members 43. Each end of the first transmission rod 41 can be respectively provided with a first extending plate 411. The first transmission rod 41 can be fixed and connected to the first extending plate 411. The first extending plate 411 can be pivotal connected to the support frame 10 with a first pivot L1 (showing in FIG. 5). Each of the two first connecting plates 42 can be pivotally connected to the first extending plate 411 with a second pivot L2 (showing in FIG. 6). The pillow plate 20 can be connected to the two first connecting plates 42. One end of each of the two elastic members 43 can be connected with the first extending plate 411, and the other end of each of the two elastic members 43 can be connected with each of the two first connecting plates 42. The two elastic members 43 can be used to reset the first connecting plate 42. The first driving member 30 can be connected with a middle part of the first transmission rod 41 and configured for driving the first transmission rod 41 and the first extending plate 411 to rotate about the first pivot L1.

Referring to FIG. 5 and FIG. 6, two ends of the first transmission rod 41 can be pivotal connected to the support frame 10 by the first extending plate 411. The middle part of the first transmission rod 41 can be connected to the output shaft 321. When the output shaft 321 is extended out, the first transmission rod 41 rotates along the direction B about the first pivot L1, resulting in the pillow plate 20 rotated together and tilted. When the output shaft 321 retracts, the first transmission rod 41 rotates along the direction C, resulting in the pillow plate 20 returning back and resetting.

Figure 7:
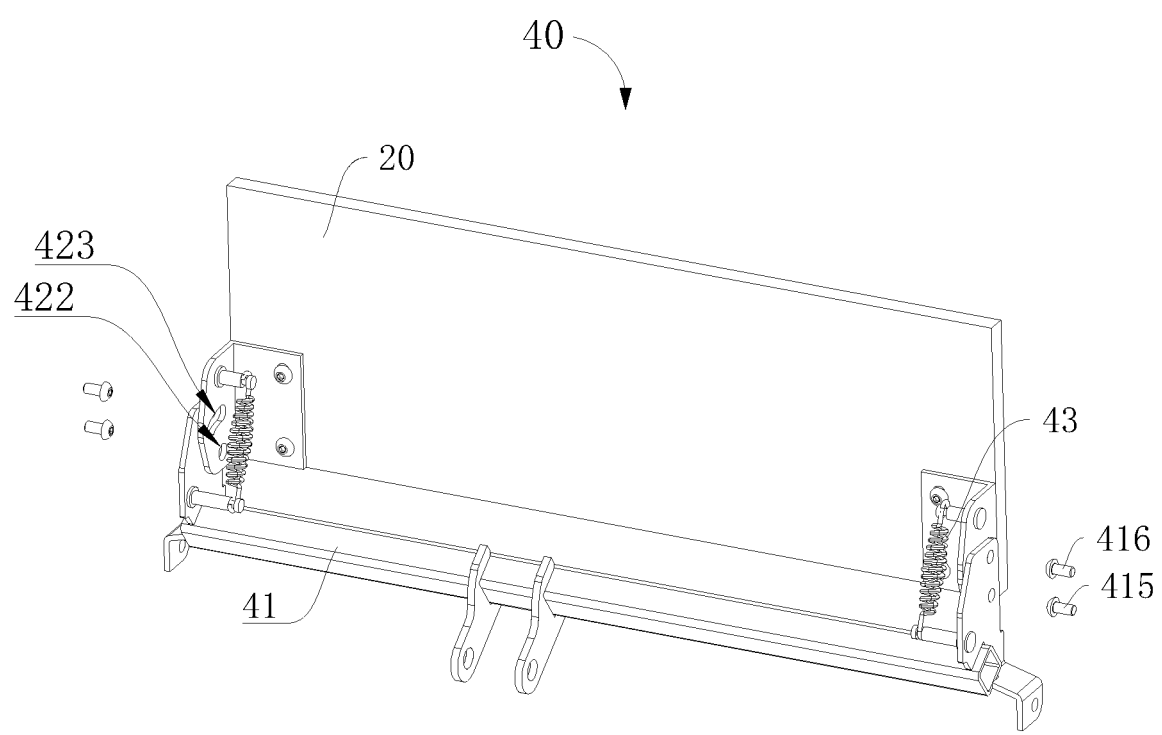
FIG. 7 is a perspective view of a first transmission member of the headrest device of FIG. 5.

Referring to FIG. 7, the first extending plate 411 is used to provide a better installation for the first connection plate 42. The first extending plate 411 is provided with a first protrusion 412. The first protrusion 412 extends along an axis of the first transmission rod 41. The first protrusion 412 can be contracted away from the end of the first extension plate 411 and configured for embedding and fixing the elastic member 43.

A first hole 413 can be defined in the extending plate 411. A first limiting member 415 can be disposed in the first hole 413. The first limiting member 415 passes through the first connecting plate 42 and the first hole 413, so that the first limiting member 415 becomes a pivotal point of the second pivot L2, and the first connecting plate 42 is movable about the first hole 413 relative to the first extending plate 411.

A second hole 414 can be defined in the first extending plate 411. A second limiting member 416 can be also disposed in the second hole 414. The second limiting member 416 penetrates through the first connecting plate 42 and the second hole 414 for limiting the relative position between the first extending plate 411 and the first connecting plate 42. The second limiting member 416 is capable of sliding along the first sliding slot 423.

It can be understood that the first extending plate 411 and the first transmission rod 41 can be integrally formed, or can be fixed to each other by welding, riveting or the like.

The first connecting plate 42 can be substantially L-shaped, one end of which is connected to the first extending plate 411 and the other end of which is connected to the pillow plate 20. The first connecting plate 42 can be rotated by the first transmission rod 41, resulting in the pillow plate 20 rotated together and tilted, thereby realizing multi-angle support for the human head.

The first connecting plate 42 can be provided with a second protrusion 421 for hanging the elastic member 43. The second protrusion 421 can extend in the same direction as the first protrusion 412 to facilitate the fixing of the elastic member 43.

Figure 8:
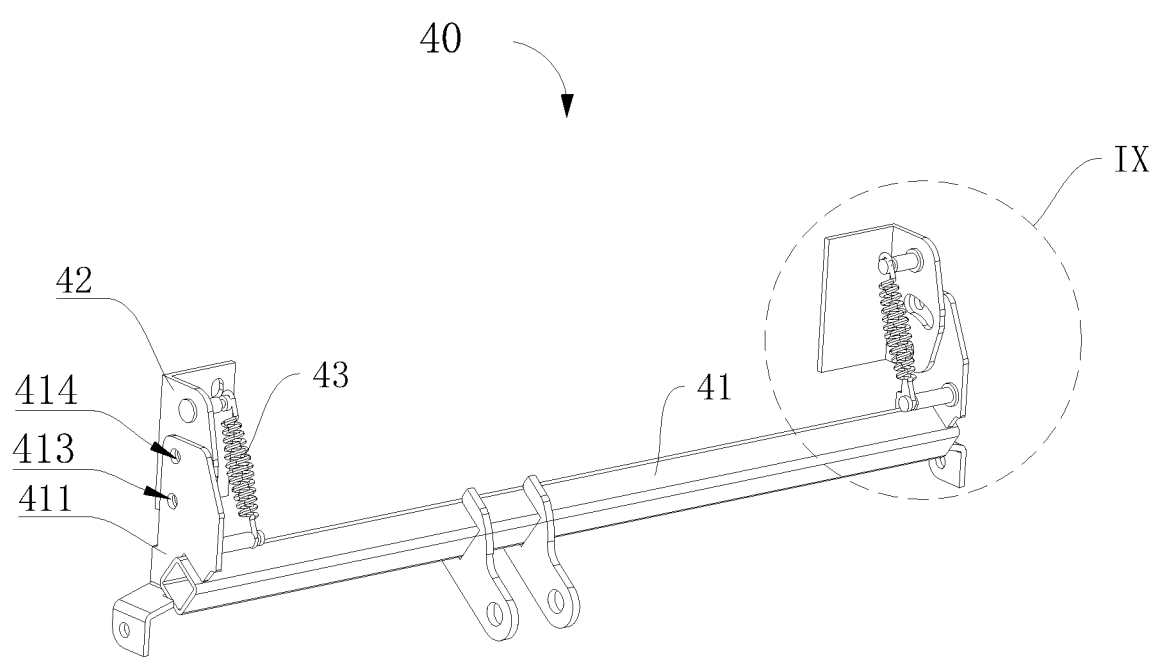
FIG. 8 is another perspective view of the first transmission member of FIG. 7 without a pillow plate.

Referring to FIG. 7 and FIG. 8, the first connecting plate 42 can define a third hole 422 matched with the first hole 413. The first limiting member 415 that penetrates the first hole 413 can also pass through the third hole 422. The connecting plate 42 can be pivotally moved around the first transmission rod 41 with the first limiting member 415 as the pivotal point.

Figure 9:
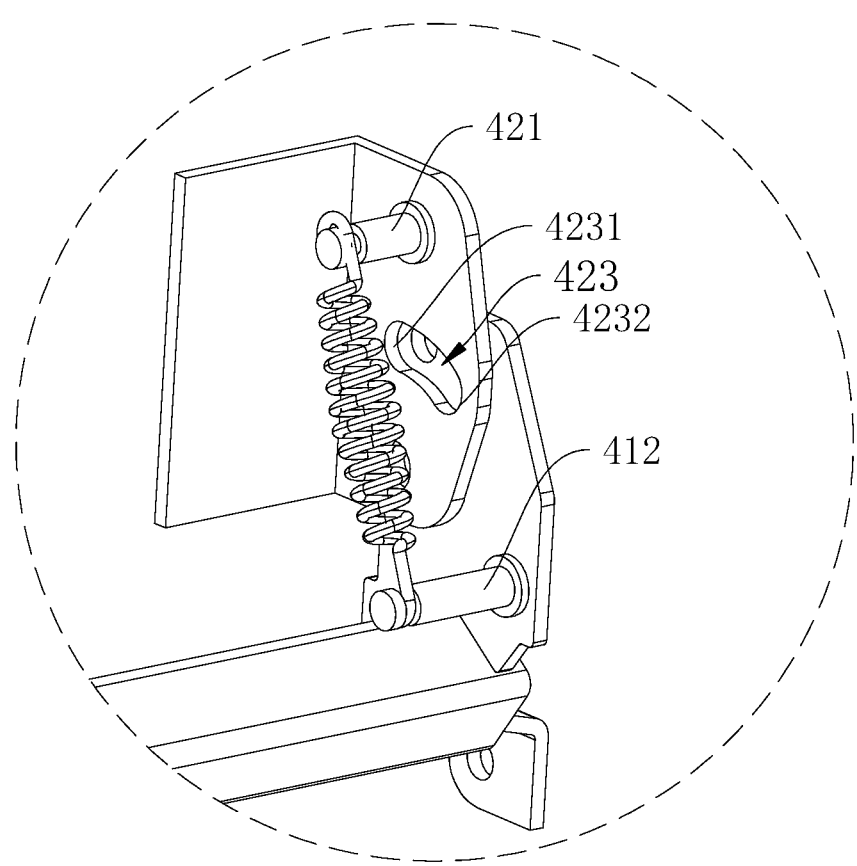
FIG. 9 is a partial enlarged view of circled portion IX shown in FIG. 8.
Figure 10:
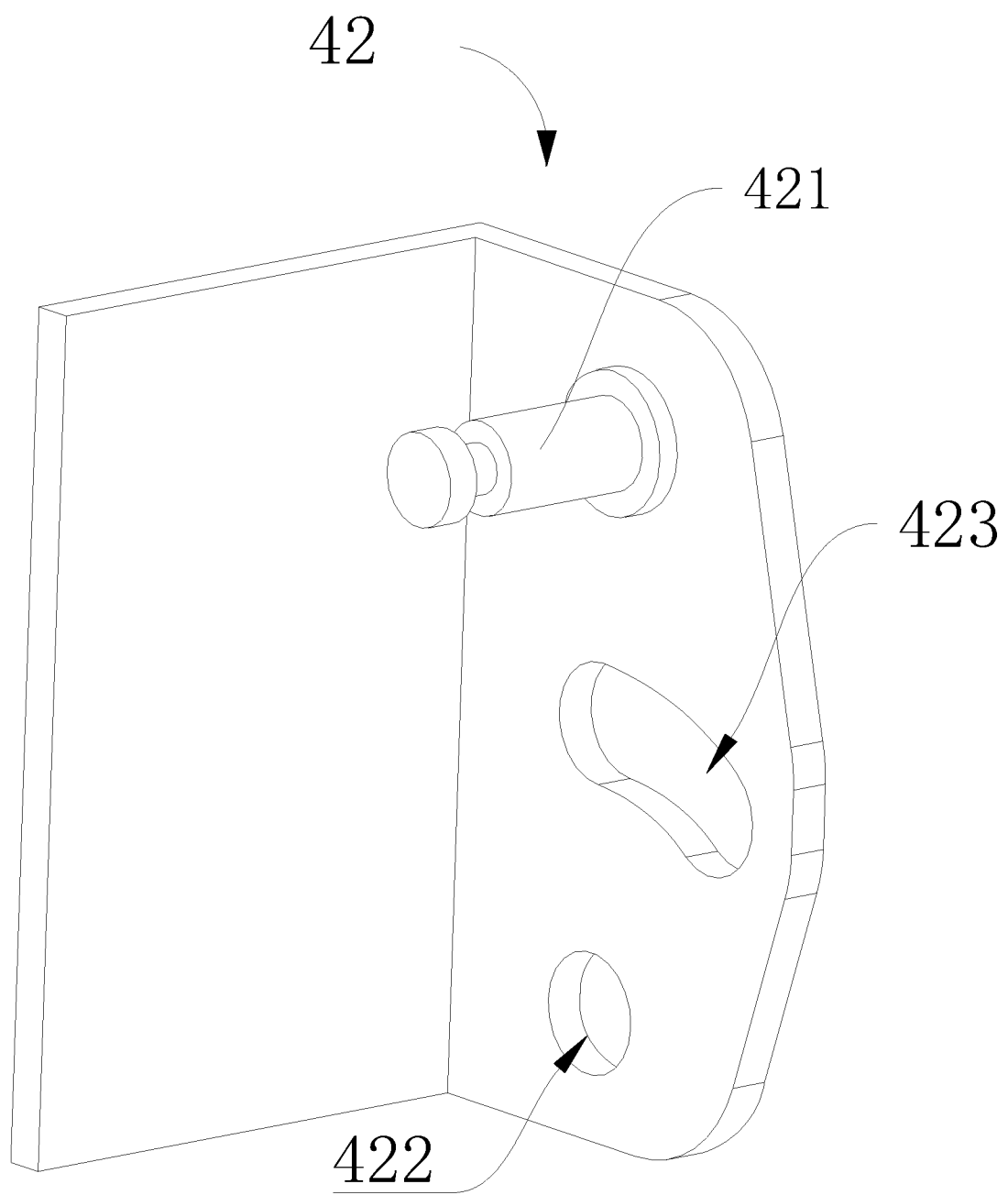
FIG. 10 is a perspective view of a first connecting plate of the first transmission member of FIG. 8.

Referring to FIG. 9, a first sliding slot 423 can be defined in the first connecting plate 42 and matched with the second hole 414. The second limiting member 416 that penetrates the second hole 414 passes through the sliding slot 423. The first connecting plates 42 can be allowed to rotate within a second angle with the first limiting member 415 as the pivotal point. By this way, the elastic member 43 can play a role of maintaining mutual fixation between the first connecting plate 42 and the first extending plate 411.

The first sliding slot 423 has two ends, which are a first end 4231 and a second end 4232 opposite to the first end 4231. The first connecting plate 42 can move relative to the first transmission rod 41 at the first end 4231 and the second end 4232 of the sliding slot 423. The start end rotation, that is, the first sliding slot 423 limits the second angle of the first connecting plate 42 rotating relative to the first transmission rod 41.

In the embodiment, in order to match the movement of the first connecting plate 42, the first sliding groove 423 can be an arcuate groove.

One end of the elastic member 43 is fixed at the first protrusion 412, and the other end of the elastic member 43 is fixed at the second protrusion 421. The elastic member 43 is in a stretched state configured for providing a force making the first connecting plate 42 toward the first transmission rod 41, resulting in the first transmission rod 41 and the first connecting plate 42 moving together.

Due to the force of the elastic member 43, the second limiting member 416 will abut the first end portion 4231 of the first sliding slot 423. The first connecting plate 42 can maintain stationary and stable relative to the elastic member 43 and the first transmission rod 41. The first transmission member 40 can rotate in a unitary orbiting motion.

Figure 11:
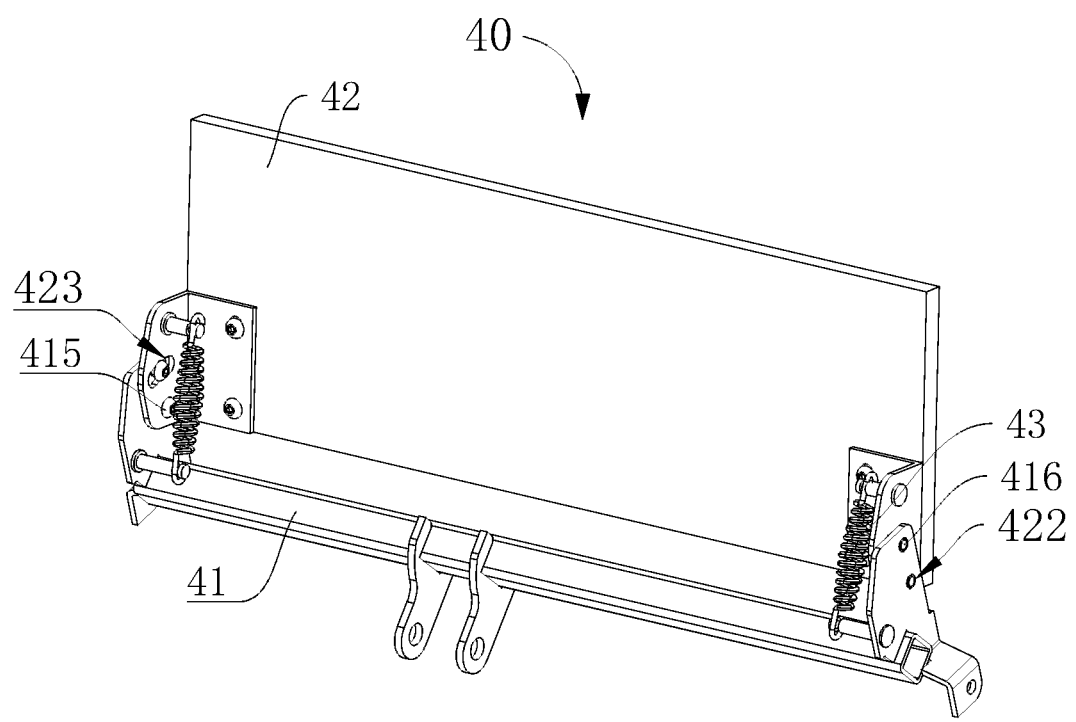
FIG. 11 is another perspective view of the first transmission member of FIG. 7 when there is an obstruction to the pillow plate.
Figure 12:
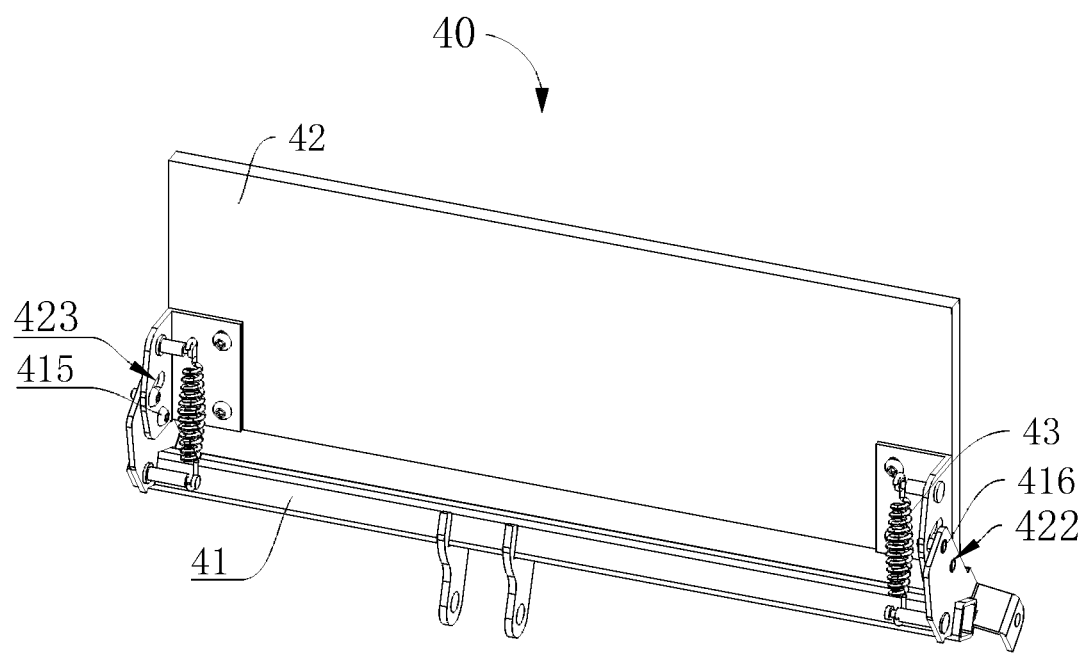
FIG. 12 is another perspective view of the first transmission member of FIG. 7 when there is an obstruction to the pillow plate.

Referring to FIG. 11 and FIG. 12, when a finger or an arm extends into the space on the back of the pillow plate 20, the first connecting plate 42 is blocked and the second limiting member 416 will abut the second end portion 4232 of the sliding slot 423 to prevent the human body from being hurt. When the finger or the arm is moved away, the second limiting member 416 will return to the first end portion 4231 of the sliding slot 423.

The headrest device 100 can have a first rotating process without an obstruction and a second rotating process with the obstruction.

Referring to FIG. 5 and FIG. 6, there is no obstruction nearby the pillow plate 20, in the first rotating process, the first transmission member 40 and the pillow plate 20 rotate about the first pivot L1 relative to the support frame 10 resulting in making the pillow plate 20 tilt. That is, the two first connecting plates 42 and the first extending plate 411 will rotate together and can be regarded as an integrity structure.

Referring to FIG. 6, when the first driving member 30 in the headrest device 100 performs a tilting operation of the pillow plate 20, the power source 32 performs an elongate motion and the output shaft 321 extends, resulting in the first transmission rod 41 rotating along the direction B. The first transmission rod 41 is integrally formed with the first connecting plate 42 under the elastic force of the elastic member 43. At this time, the second limiting element 416 abuts the first end portion 4231 of the sliding groove 423. The first driving member 30 will drive the first transmission member 40 and the pillow plate 20 to rotate integrally with respect to the support frame 10. The first transmission member 40 and the pillow plate 20 rotate about the first pivot L1, resulting in tilting the pillow plate 20 to realize the support for the human head.

Referring to FIG. 5, when the first driving member 30 in the headrest device 100 performs a resetting process of the pillow plate 20, the power source 32 performs a retracting motion and the output shaft 321 retracts, resulting in first transmission rod rotates along the direction C. The first transmission rod 41 is still integrally formed with the first connecting plate 42 under the elastic force of the elastic member 43. At this time, the second limiting element 416 still abuts the first end portion 4231 of the sliding groove 423. The first transmission member 40 and the pillow plate 20 rotate back about the first pivot L1, resulting in resetting the pillow plate 20.

Therefore, the first transmission member 40 and the pillow plate 20 rotate in the form of an integrity when no external obstructions are present, and the first end portion 4231 of the sliding slot 423 abuts the first end portion 4231 of the sliding groove 423.

Referring to FIG. 11 and FIG. 12, in the second rotating process, when there is an obstruction nearby the pillow plate 20, the pillow plate 20 and the two first connecting plate 42 rotate about the second pivot L2 relative to the first extending plate 411. That is, the two first connecting plates 42 and the first extending plate 411 can be regarded as separated.

Referring to FIG. 11 and FIG. 12, when the first driving member 30 in the headrest device 100 performs a resetting process of the pillow plate 20, the first transmission rod 41 tends to rotate along the direction C. The first connecting plate 42 is obstructed by the finger and the like. The second limiting member 416 will slide from the first end portion 4231 to the second end portion 4232 of the sliding slot 423, stopping the rotation of the first transmission rod 41, which will prevent injury.

After the obstruction is removed, the second limiting member 416 will return from the second end portion 4232 to the first end portion 4231 of the sliding slot 423 under the elastic force of the elastic member 43. The first connecting plate 42 will rotate back about the first pivot L1, resulting in resetting the pillow plate 20.

The first connecting plate 42 and the first transmission rod 41 are no longer relatively fixed, but rotate relative to each other within the second angle for preventing injury.

The first transmission member 40 has an anti-trap function regardless of whether the first driving member 30 works or not.

Figure 13:
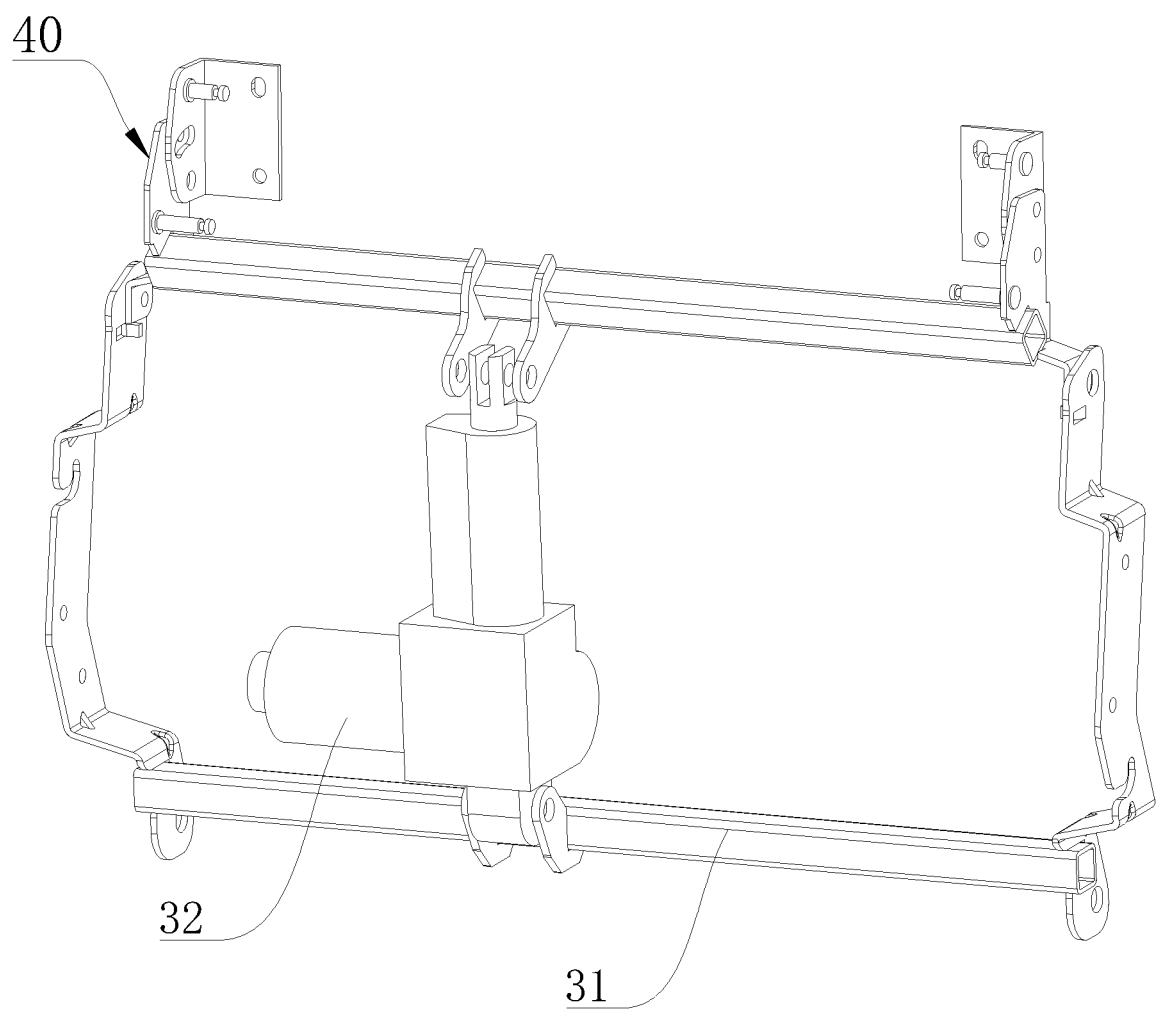
FIG. 13 is a perspective view of another embodiment of a first driving member, a first transmission member and a fixed plate.

Referring to FIG. 13 and FIG. 14, another sofa accessory 200 including a headrest device 100 is further provided. The sofa accessory 200 can further include a lumbar support assembly 50 for supporting a waist portion of a human body to improve comfort of the human body when sitting.

The lumbar support assembly 50 includes a second driving member 51 and a waist plate 52. The second driving member 51 can be disposed on the support frame 10. The second driving member 51 is configured for driving the waist plate 52 to rotate, resulting in tilting the waist plate 52 tilt. The waist plate 52 can be configured for supporting the waist of the human body.

The second driving member 51 can be a linear motor. In other embodiments, the second driving member 51 can also be other types of power devices such as a hydraulic motor.

In the present embodiment, in order to better fix the lumbar support assembly 50, the fixing element 31 can have a "Z" shape, one part of which is configured to connect to the power source 32 of the first driving member 30, and another part of which is coupled to the second driving member 51. In other embodiments, the fixing element 31 can also be linear shaped as shown in FIG. 13.

The headrest device 100 and the sofa accessory 200 including the headrest device 100 have many advantages including the following: because each of the two first connecting plates 42 is pivotal connected to the first extending plate with the second pivot L2, the two first connecting plates 42 are configured for rotating about the second pivot L2 relative to the first extending plate 411. If the arm and limbs of a human body reached the back of the tilted pillow plate 20 they are regarded as an obstruction, such that in a returning back process of the pillow plate 20, the two first connecting plates 42 can rotate about the second pivot L2, in order to prevent injury to the arm and limbs.

The sofa accessory 200 including the headrest device 100 has broad applications.

The technical features of the above-described embodiments may be in any combination. For the sake of brevity of description, all possible combinations of the technical features in the above embodiments are not described. However, as long as there is no contradiction between the combinations of these technical features, all of the combinations should be considered as within the scope of this disclosure.

Although the devices have been described and illustrated using certain embodiments, however, the disclosure is not limited by the precise details set forth above. Many variations and modifications will be evident to those skilled in the art and may be made without departing from the spirit and scope of the disclosure.

What is claimed is:

1. A headrest device comprising:
a support frame;
a pillow plate;
a first driving member disposed on the support frame; and
a first transmission member comprising a first transmission rod, two first connecting plates and two elastic members;
wherein each end of the first transmission rod is respectively provided with a first extending plate pivotally connected to the support frame with a first pivot;
each of the two first connecting plates is pivotally connected to the first extending plate with a second pivot;
the pillow plate is connected to the two first connecting plates;
one end of each of the two elastic members is connected with the first extending plate, and another end of each of the two elastic members is connected with each of the two first connecting plates;
the first driving member is connected with a middle part of the first transmission rod to drive the first transmission rod and the first extending plate to rotate about the first pivot;
the headrest device has a first rotating process without an obstruction, in which the first transmission member and the pillow plate rotate about the first pivot relative to the support frame to make the pillow plate tilt; and
the headrest device has a second rotating process with the obstruction, in which the pillow plate and the two first connecting plate rotate about the second pivot relative to the first extending plate.

2. The headrest device of claim 1, wherein the first extending plate comprises a first hole, each of the two first connecting plates is provided with a third hole, and a first limiting element penetrates through the first hole and the third hole and is defined as the second pivot.

3. The headrest device of claim 2, wherein the first extending plate further comprises a first sliding slot to limit the second angle in the second rotating process.

4. The headrest device of claim 3, wherein each of the two first connecting plates further comprises a second hole, and a second limiting element penetrates through the second hole and the first sliding slot and is capable of sliding along the first sliding slot.

5. The headrest device of claim 1, wherein the first extending plate comprises a first protrusion connecting with the one end of each of the two elastic members, and each of the two first connecting plates comprises a second protrusion connecting the other end of each of the two elastic members.

6. The headrest device of claim 1, wherein the first extending plate is disposed on ends of the first transmission rod to support the first transmission rod.

7. The headrest device of claim 1, further comprising a cushion covering the support frame.

8. The headrest device of claim 1, wherein the first drive member comprises a linear motor.

9. A sofa accessory comprising the headrest device of claim 1.

10. The sofa accessory of claim 9, further comprising a lumbar support assembly disposed on the support frame, the lumbar support assembly comprising a second driving member and a waist plate to support a waist of a human body, wherein the second driving member is disposed on the support frame to drive the waist plate to rotate to cause the waist plate to tilt.

* * * * *